United States Patent [19]

Juffa et al.

[11] 4,228,683
[45] Oct. 21, 1980

[54] METHOD OF DETERMINING LIQUID FLOW IN A CONDUIT

[75] Inventors: Richard Juffa, Cologne; Georg Wawra, Leverkusen; Walter Uerdingen, Schildgen, all of Fed. Rep. of Germany

[73] Assignee: Bayer Aktiengesellschaft, Leverkusen, Fed. Rep. of Germany

[21] Appl. No.: 896,825

[22] Filed: Apr. 17, 1978

Related U.S. Application Data

[63] Continuation of Ser. No. 813,604, Jul. 7, 1977, abandoned, which is a continuation-in-part of Ser. No. 696,153, Jun. 14, 1976, abandoned.

[30] Foreign Application Priority Data

Jun. 19, 1975 [DE] Fed. Rep. of Germany ....... 2527378
May 26, 1977 [DE] Fed. Rep. of Germany ....... 2723809

[51] Int. Cl.³ .......................... G01F 1/68; G01F 1/70
[52] U.S. Cl. .................................................... 73/204
[58] Field of Search ................. 73/194 E, 194 F, 204

[56] References Cited

U.S. PATENT DOCUMENTS

| 2,569,974 | 10/1951 | Campbell | 73/194 |
|---|---|---|---|
| 2,603,089 | 7/1952 | Morley et al. | 73/204 |
| 2,724,271 | 11/1955 | Shawhan et al. | 73/204 |
| 3,019,647 | 2/1962 | Beard et al. | 73/204 |
| 3,399,566 | 9/1968 | Brown | 73/204 |
| 3,739,636 | 6/1973 | Versaci | 73/194 |
| 3,922,912 | 12/1975 | Bradbury et al. | 73/204 |
| 4,028,689 | 6/1977 | Schopp | 73/204 |

Primary Examiner—Herbert Goldstein
Attorney, Agent, or Firm—Gene Harsh; Lawrence S. Pope

[57] ABSTRACT

The instant invention provides a method for determining the streaming velocity of a streaming liquid by injecting a thermopulse into the liquid and measuring its transit time. The pulse is detected by its ascending flank at downstream points and by its ascending or descending flank at its point of injection. For short transit times, provision is made to eliminate the heat up time of the heating wire imparting the pulse from the transit time measurement. The liquid may stream continuously or discontinuously, and if the later, provision is made to delay measurement on initiation of flow until the flow pattern has stabilized. The time is determined by counting pulses from a pulse generator during the period the pulse is traveling between the point of injection and a detection point or between two detection points.

5 Claims, 2 Drawing Figures

4,228,683

METHOD OF DETERMINING LIQUID FLOW IN A CONDUIT

This is a continuation of application Ser. No. 813,604 filed July 7, 1977, now abandoned, which is a continuation-in-part of application Ser. No. 696,153 filed June 14, 1976 now abandoned.

BACKGROUND OF THE INVENTION

The monitoring of fluid flow is important in a wide variety of fields. An application of particular interest has been determining the volumetric throughput of paint in spray painting. A number of methods for such monitoring have been proposed in the past including devices mechanically moved by the streaming fluid such as paddle wheels and the measurement of the transit time of tracers such as heat pulses injected into streaming fluid. However, the precision and dependability of these methods has been found to be inadequate in certain applications. For instance, in spray painting with two component lacquer systems such as polyurethanes, it is important to control the ratio of the two components within narrow limits or a serious loss of quality may be experienced. To achieve this control, it is important to very precisely monitor the flow of one component and adjust the flow of the other component accordingly. Prior art monitoring processes have been found to be insufficiently accurate or reproducible particularly in the low output rates (50 to 200 cm$^3$/min) encountered in spray lacquering and coating.

It is an object of this invention to provide a method of monitoring the streaming velocity in fluid systems which is both accurate and reproducible. It is a further object to provide a method which can determine the streaming velocity very quickly allowing almost continuous monitoring.

SUMMARY OF THE INVENTION

In order to determine the streaming velocity of a fluid according to the present invention, a heat pulse is injected into the fluid and its transit time is measured over some fixed distance. The arrival of the heat pulse at the downstream measurement point is determined by detecting the ascending flank of the pulse. If the transit time is determined from the point of production to a downstream detection point, either the ascending or descending flank of the heat pulse may be used to initiate the measurement. On the other hand, if the transit time is determined between two points downstream of the point of injection, the measurement is initiated by the arrival of the ascending flank at the first or more upstream of these points. The transit time is determined by digitally measuring the interval between the first and subsequent detection of the heat pulse. Of course, the transit time can be determined between more than two consecutive detection points downstream of the point of injection, using the arrival of the ascending flank of the heat pulse as the detection event.

DETAILED DESCRIPTION OF THE INVENTION

Figure 1:
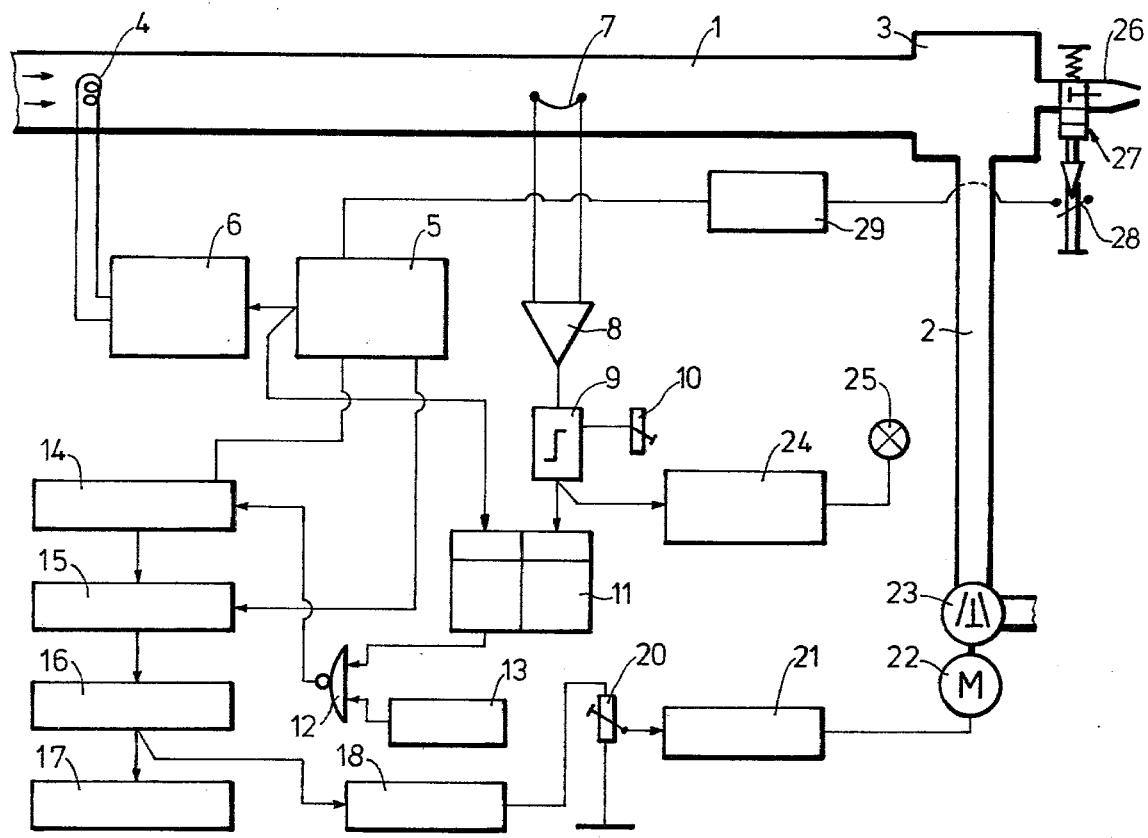
FIG. 1 shows a schematic diagram of an apparatus for the regulated dosing of a two component mixture using the principle of transit time measurement.

The method of the present invention can be employed in any number of environments which the present disclosure will suggest to those skilled in the art. However, for the purposes of illustration, the use of this process in facilitating flow control in a multi-component system will be described hereinafter. As will be evident to one skilled in the art, many of the features and embodiments illustrated in this environment would find utility in other environments.

In the field of lacquer coating, the lacquer components are frequently not continuously but intermittently conveyed; e.g. when a manually operated spraying gun is used. Pursuant to the present invention and in consideration of this object, a heat impulse is injected into the pipe at substantially the first moment of restoring the flow of the components.

It has been found that the accuracy of transit time measurement can be improved when the transit time is determined by measuring the time lag at the moment where the ascending or descending flank of the heat impulse appears at the first point and the moment where the ascending flank of the heat impulse arrives at the second point. Thus, at the first point, it is not critical which flank of the heat impulse is used for measurement, whereas at the second point, the steep temperature increase at the ascending flank, i.e. the front flank of the heat impulse, is to be detected and used for further signal processing. It is evident that this embodiment may also be extended to the previously described method where the traveling heat impulse is detected at more than one point downstream of the first point. This means that the transit time is determined by measuring the time lag at the moments where the ascending flank of the heat impulse appears at two different other points downstream of said first point.

It is advantageous if the transit time measurement is effected periodically by periodically injecting a heat impulse at said first point.

For the purpose of providing a continuous signal for a control member, it has been proven successful to store electrically the instantaneous flowrate obtained from a measurement of transit time of an individual heat impulse until the measurement of transit time is effected with the following heat impulse. In particular, the storage of measurement is helpful when components are periodically conveyed. In this case, the value of the last measured flowrate is electrically stored and the flowrate in the other pipes is controlled in the following period of conveyance with this measurement result until a subsequent measurement of flowrate is taken.

In one embodiment of the invention, the transit time is digitally measured in at least one pipe by supplying impulses at a constant pulse frequency to an impulse counter for the period where the heat impulse travels from the first point to one of the other points or the distance between two successive other points. The counter content is then converted into a digitally quantity in the binary code which is proportional to the flowrate and thereafter may be reconverted into an analogous signal for actuating control means in the other pipes.

If the method according to the invention is applied to a two component system, the transit time measurement takes place in one pipe leading to the mixing chamber, while the flowrate in the other pipe may be adjusted accordingly. The two flowrates may then be held in a fixed ratio to one another independent of the absolute throughput.

A further modification of the invention comprises periodically heat impulses and triggering a new heat impulse at the first point when the heat impulse is detected at the second point. The resulting impulse frequency can then be used as a measure of the flowrate.

An apparatus for utilizing the method, comprises a mixing chamber, a plurality of pipes connected to the mixing chamber, in each of which is arranged an electrically activated dosing device, and in a further pipe connected to said mixing chamber, a heating wire arranged in the pipes and downstream of the heating wire a thermoelectric heat sensor, the heat sensor being electrically connected to an amplifier and a voltage comparator, means for producing periodic heat impulses by passing a current through the heating wire, an electric pulse generator supplying pulses into a counter during the transit time, during which a heat impulse travels from the heating wire to the thermoelectric sensor, a storing unit for storing the counter content until the next following heat impulse reaches the thermoelectric sensor, a code converter for converting the counter content into a quantity in the binary code, which is proportional to the flowrate, a digital analog converter for reconverting this quantity into an analogous signal and amplifier means for amplifying the analogous signal, which is connected to electrically activated dosing devices in the other pipes, the dosing rate of which is proportional to the voltage applied.

Preferably, the apparatus is provided with a heating wire having a weight of less than 15 mg and means for periodically discharging a condensor through the heating wire within a few milliseconds. The duration of the heat impulses is within the range from 5 to 100 ms. In practice, the distance between the heating wire and the thermoelectric heat sensor may be within the range from 5 to 500 mm.

As a thermoelectric heat sensor, a differential thermocouple has been proven particularly successful.

Investigations of lacquer flow conditions have shown that the reciprocal of the flowrate and the transit time are not always proportional to each other but are correlated by a non-linear function. To resolve this difficulty, the code converter in the apparatus is programmed to account for the particular function between the flowrate and the transit time to yield finally a quantity which is proportional to the flowrate.

The transit time measurement section is advantageously designed so that the impulse duration of the heat impulse is from 5 to 100 ms and the distance between the heating wire and the heat sensor is in the range of from 5 to 500 mm.

An important advantage of the method according to the invention is that precisely working dosing pumps are not required. Such pumps are generally very susceptible to faults.

Moreover, the flowrate determination according to the invention works without moving parts and the flow is independent of the pressure, the optical transparency, the electrical conductivity and the viscosity of the components. Very low flowrates can also be dosed, since the dead volume of the measuring device is very low. Because of its small structural volume, the transit time measuring section and thus the regulation device can be fitted to hand operated mixing heads. The simple construction provides for troublefree exchange and cleaning.

In the accompanying drawings:

In FIG. 1, a first component, e.g. a solution of a polyester resin containing hydroxyl groups with a 60% solids content, is conveyed through pipe 1 and a second component, e.g. a polyisocyanate based hardener, is conveyed through a second pipe 2 into a mixing chamber 3. The mixing chamber 3 is directly connected to a spray gun. The components are conveyed by the application of an air or nitrogen over-pressure in an enclosed storage tank or out of ring pipes as is customary in the motor industry.

The ratio of the flowrates of the two components must always be kept constant to assure a uniform quality of the lacquering. To measure and regulate the quantity flow ratio, a platinum heating wire 4 of 0.25 mm diameter in the form of a coil having five turns with a diameter of 2 mm, is incorporated in the center of the pipe 1. This heater is heated up within a few milliseconds periodically or aperiodically by current impulses generated by discharging a condensor via the heating wire. Typical data for the platinum wire are: Resistance 1,5 Ohm, weight 10 mg, pulse voltage 5 volts, pulse duration 50 ms. The discharge of the condensor is controlled via a transistor switch by the power amplifier 6 which is fed by an impulse generator 5 (tact generator). The heat pulse produced in this manner, is imparted to the central portion of the streaming liquid. This portion is then carried along with the flow as a heat plug. The heat plug after traveling for the period of the transit time T, reaches the thermoelectric heat sensor 7 incorporated in the center of the flow. The transit time T is directly proportional to the distance between the heater and the thermoelectric sensor 7 and inversely proportional to the streaming velocity and thus the flowrate. In a preferred embodiment, the distance between heater and sensor is in the range of 40–50 mm; however, this distance may be varied for obtaining a higher accuracy or shorter measuring time. The heat sensor 7 is a differential thermocouple element with a very low response time, which ensures that slow changes in the basic temperature of the liquid have no effect on the measurement. The temperature rise as the heat plug flows past is recorded substantially without delay.

When using a device with the previously indicated data, the maximum temperature at the differential thermocouple is reached within 20–100 ms depending on the streaming velocity.

The voltage produced at the differential couple element 7 is amplified by a chopper amplifier 8 with an amplification $> 10^4$ so that a temperature increase of 1° C. at the differential thermocouple is already sufficient to activate the threshold comparator 9. The threshold value of the comparator 9 is adjusted to such a low voltage that the steep temperature increase at the ascending flank of the received thermopulse at the thermocouple activates the comparator almost immediately to switch. It has been surprisingly found that a more precise measurement of transit time can be obtained when using the ascending flank, i.e. the front flank of the thermoimpulse to excite the comparator 9.

The transit time of the heat plug is now digitally determined. Simultaneously, with the current impulse through the heating wire 4, a bistable multivibrator 11 is set and is reset on receipt of the signal from the comparator 9. The period during which the bistable monovibrator 11 is set, corresponds to the transit time of the heat plug through the pipe 1 and is inversely proportional to the flowrate of the component in the pipe.

The measurement of the transit time is performed in the following manner. During the set time of the multivibrator 11 pulses from an impulse generator 13 are fed into an impulse counter 14 through a gate switch 12. The counter 14 is each time set to zero by a signal supplied from the tact frequency generator 5 at the time of producing a new heat pulse. The pulses previously counted during a measuring cycle are temporarily stored in a digital store 15 until the next measuring cycle. This storing is necessary to deliver to the circuit an uninterrupted signal for controlling the dosing pump 23. Storing of the counter content is also of particular importance when the components in the pipes are not continuously but periodically conveyed (cycling on-off operation). The value of the last measured flowrate is then stored in another digital storing unit (not shown) and the flowrate in the other pipes is controlled in the following period of conveyance on the basis of the stored value until a subsequent measurement of flowrate is taken.

To convert the transit times measured into flowrates, a permanently programmed ROM-code converter 16 is used ("read only memory"). The counter content of the pulse counter 14 indicates for every measuring cycle the address from which the flowrate may be read from the ROM-element. Address and flow quantity are correlated previously by reading the program into the ROM. Normally, the flowrate is inversely proportional to the address. However, by modifying the program of the ROM, corrections resulting from the particular flow profile can be taken into account. Such corrections are for instance necessary in the case of liquids showing structural viscosities (non-Newtonian liquids). The reciprocal of the flowrate and the transit time are then no longer correlated by the usual linear function. It is, however, possible by appropriately programming the ROM to obtain a correct flowrate measurement even under these unusual circumstances. Also corrections may be employed for compensating non-linear effects of the dosing pump 23.

For direct digital indication of the flowrate in pipe 1, the output of the code converter 16 is connected to a numerical indicator unit 17. For analogue indication and to obtain a signal for control purposes, the digital output signal of the code converter 16 is converted by a digital analogue converter 18 into an analogue voltage. This voltage is passed through a voltage divider 20, by means of which the desired ratio between the flowrate of the liquid in the first pipe 1 and the flowrate to be regulated in the second pipe 2 is preselected. The regulation of the second component takes place by feeding the nominal value of the voltage coming from the voltage divider 20 to a proportional power amplifier 21, which supplies the drive motor 22 for a dosing pump 23 in pipe 2. Instead of a dosing pump, (constant displacement pump), a motor-driven regulator valve or aperture can also be used.

If the device is operated with periodic heat pulses, the function of the device is monitored by a retriggerable monovibrator 24. If the liquid is streaming, voltage pulses corresponding to the heating cycles must arrive at the comparator 9. These voltage pulses are setting continuously the retriggerable monovibrator 24. In the event of interruption of the impulse sequence (e.g. caused by a defect in the heating wire 4, the thermocouple element 7, impulse amplifier 8, or by a flow stoppage) an alarm device 25 is activated. If the flow is stopped by intention, e.g. in the case of intermittently lacquer spraying, the monitoring unit 24 is disconnected for the time of interruption. When operating the device intermittently, the outlet nozzle 26 of the mixing chamber 3 is provided with a shutting valve 27 which controls a switch 28, being connected to the pulse generator 5. By a switch 28, the impulse generator 5 is then energized and activated in such a manner that almost simultaneously with the moment of restoring the flow in pipe 1 by opening the valve 27 the pulse generator 5 is started to impart a thermoimpulse via power amplifier 6 and heating wire 4 to the streaming liquid in pipe 1. It has been observed in this connection that the measurement of transit time may be obscured by an unstable flow pattern just after restoring the flow by opening the valve 27. Therefore, an adjustable delay unit 29 is introduced in the line between the mechanical switch 28 and the impulse generator 5. The delay is adjusted to such a value (in the order of a few milliseconds) that the first thermo-impulse is not till then injected when the irregular flow has been disappeared and steady state conditions are prevailing again in pipe 1. It has been found that the period of restoring the steady state conditions is usually very short, i.e. in the order of a few milliseconds.

According to a modified embodiment of the invention, a series of differential thermocouples 7 is arranged within the pipe 1 downstream of the heating wire 4. The thermo-impulse then passes sequentially the series of thermocouples, producing successive electric pulses. With this device, a shorter response time and higher accuracy of transit time measurement can be obtained which is however couterbalanced a more complex and expensive measuring device. The transit time of the thermoimpulse is then measured between two successive thermocouples in pipe 1. The distances between the sensors may be very small (i.e. in the order of 1 cm), since only the passage of the steep flank of the heat pulse is used for signal processing. The measurement is carried out with an electronic circuit which is very similar to that which has already been described. When the thermoimpulse passes the first thermocouple, pulses are counted at a constant rate into counter 14 until the thermoimpulse arrives at the second thermocouple. Signal processing is then performed in the same manner as described above in connection with FIG. 1. This embodiment is particularly useful e.g. with lacquer spraying in the automotive industry useful e.g. with lacquer spraying in the automotive industry when the dosing device is operated for very short periods (<1 s) and more than one flow measurement is required within said period of operation. When using more than two thermocouples and taking successive measuring values for the transit time along the series of thermocouples, a multiplexer may be used to switch the input of the circuit (preamplifier 8) to successive thermocouples in pipe 1.

In one embodiment of the control circuit instead of the analogue quantity regulation, direct digital regulation is implemented. For this purpose, a frequency proportional control motor (e.g. stepping motor) is used to drive the dosing pump 23, being fed directly with the amplified digital output signal of the code converter 16.

A variant of the regulation device for a two component system involves incorporating a transit time measurement section in both pipes and regulating the flowrate in both pipes. With this embodiment, not only the quantity ratio of the components but also the absolute quantity of the finished mixture can be maintained constant.

Figure 2:
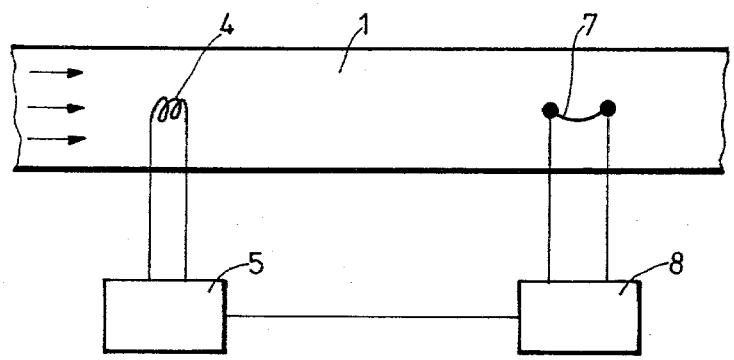
FIG. 2 shows a modified transit time measurement section with feedback coupling of the heat sensor to the heat impulse transmitter.

A further possibility of signal processing is schematically shown in FIG. 2. The voltage impulse generated by the heat plug is here used to trigger a new heat impulse in the impulse generator 5; i.e. each heat plug arriving at the thermocouple element 7 immediately triggers off a new heat impulse at the heating wire 4. The resultant impulse frequency is directly proportional to the flowrate in the pipe 1. It can be used in a similar manner, as already described in the first embodiment, for the regulation of the second component.

When measuring very short transit times (high streaming velocity and/or very short transit time measuring distance), the time constant for heating the heating wire is no longer small compared to the transit time, thus reducing the accuracy of the measurement. This disadvantage can be overcome by the following modification of the circuit:

The multivibrator 11 is set at the initiation of the heat pulse by imparting the current pulse to the heater but the pulse counter 15 is set to zero after a delay equal to the heat up time of the heating wire. In this way, those pulses which are delivered through gate 12 to the pulse counter during the heat up time are eliminated.

With the arrangement described with reference to FIG. 1, two component polyurethane lacquers were produced and processed ready for spraying. One component contained a polyester solution with pigments and abrasive additives (e.g. pigments containing $SiO_2$), while the other component consisted of a hardener solution comprising polyisocyanates. The dosing of such mixtures is normally difficult on account of corrosion at the measuring and dosing elements. No indication of corrosion was observed on the transit time measuring section even after a long period of operation. It is significant that the measuring element has no moving parts. For cleaning purposes, it can be easily installed and removed. Because of the measurement principle, the viscosity—in contrast with most other measuring methods for flowrate—is not included in the measurement. According to the invention, no difficulties occur in the dosing of liquids having a viscosity of from 50 to 2000 cP and flowrates of from 20 to 1000 $cm^3$/min per component.

The method according to the invention was also tested in the production of polyurethane foams. For this purpose, a reaction mixture of diisocyanates, polyols and water together with emulsifiers, dispersion agents and catalysts was produced (see Kunststoff-Handbuch, Vol. 7, Polyurethane, Karl Hanser Verlag Munchen 1966, pages 144–149). For the production of polyurethane foams, as the first main component polyhydroxyl compounds having at least two hydroxyl groups of a molecular weight of from 62 to 10,000, preferably 62 to 5000 are used; e.g. polyesters, polyethers, polythioethers, polyacetals, polycarbonates, polyester amides having at least 2, usually from 2–8, preferably, however, 2 hydroxyl groups. The second main component should preferably consist of aliphatic, cycloaliphatic, araliphatic and aromatic polyisocyanates. In particular, the technically easily obtainable polyisocyanates are used e.g. the 2,4- and 2,6-toluylene diisocyanates and any mixtures of these isomers and polyphenyl polymethane polyisocyanates. The components must be very accurately dosed. For this purpose, the above-described regulation system according to the principle of transit time measurement has proved very effective.

Although the invention has been described in detail for the purpose of illustration, it is to be understood that variations can be made therein by those skilled in the art without departing from the spirit and scope of the invention except as it may be limited by the claims.

What is claimed is:

1. A method for measuring the velocity of a liquid flowing continuously or discontinuously in a conduit at rates between about 20 and 1000 $cm^3$/minute comprising:
    (A) injecting a thermopulse of between about 5 and 100 ms in duration into the liquid by means of a wire having a weight of less than about 15 mg and being heated by the discharge of a condenser centrally mounted in the conduit carrying said liquid,
    (B) simultaneously adjusting a bistable multivibrator to its set mode so that it allows pulses from a pulse generator to pass through a gate to a pulse counter,
    (C) activating said pulse generator for at least one measurement cycle,
    (D) detecting the arrival of the ascending flank of said pulse with a differential thermocouple mounted in said conduit between about 5 and 500 mm downstream of said heater,
    (E) amplifying the detection signal of said sensor and passing it to a comparator,
    (F) using said amplified signal to activate said comparator and using the output of said comparator to activate the reset mode of said bistable multivibrator thereby closing said gate to further pulses of said pulse generator,
    (G) reducing the value accumulated in said pulse counter by the heat up time of said wire,
    (H) converting the value accumulated in said pulse counter during the set/reset cycle of the multivibrator to a value equivalent to the velocity of said liquid by means of a permanently programmed ROM-code converter, and
    (I) storing the value accumulated in said impulse counter until the next set/reset cycle of the multivibrator is completed.

2. The process of claim 1 wherein the digital transit time measurement is initiated at a period after imparting the electric pulse to the heating wire, which is at least equivalent with the heat up time of the wire.

3. The method of claim 1 wherein said liquid flows intermittently and said thermopulse is injected after a time delay from the start of flow sufficient to allow the flow pattern to become stabilized.

4. The method of claim 1 wherein the pulse counter is set to zero after a delay equal to the heat up time of the heating wire after initiation of a velocity measurement.

5. The method of claim 1 wherein the flowing liquid has a viscosity of between about 50 and 2000 cP and a flow rate of between about 50 and 200 $cm^3$/minute.

* * * * *